United States Patent [19]

Huizinga

[11] Patent Number: 5,001,325
[45] Date of Patent: Mar. 19, 1991

[54] METHOD OF PROVIDING SCORE LINES IN PACKAGING MATERIAL

[75] Inventor: Gert J. Huizinga, Leeuwarden, Netherlands

[73] Assignee: LPF Verpakkingen B.V., Leeuwarden, Netherlands

[21] Appl. No.: 400,934

[22] Filed: Aug. 31, 1989

[30] Foreign Application Priority Data

Sep. 7, 1988 [EP] European Pat. Off. ........ 88201929.2

[51] Int. Cl.$^5$ .......................... B23K 26/00; B31B 1/25
[52] U.S. Cl. .......................... 219/121.69; 219/121.81; 493/341
[58] Field of Search ................ 493/56, 341, 335, 356, 493/396, 404, 963; 219/121.69, 121.81

[56] References Cited

U.S. PATENT DOCUMENTS

| 3,409,206 | 11/1968 | Slouka et al. ............ 493/963 |
| 3,626,143 | 12/1971 | Fry ........................ 219/121.69 |
| 3,893,129 | 7/1975 | Endo et al. ............. 219/121.81 |
| 3,909,582 | 9/1975 | Bowen .................... 219/121 |
| 4,160,894 | 7/1979 | Stemmler et al. ....... 493/341 |
| 4,307,282 | 12/1981 | Gappa .................... 219/121.69 |
| 4,549,063 | 10/1985 | Ang et al. ............... 219/121 |
| 4,740,163 | 4/1988 | Kuchenbecker ......... 493/56 |
| 4,816,015 | 3/1989 | Holder et al. ........... 493/355 |

FOREIGN PATENT DOCUMENTS

| 189909 | 8/1986 | European Pat. Off. ...... 493/59 |
| 2161427A | 1/1986 | United Kingdom . |

Primary Examiner—William E. Terrell
Attorney, Agent, or Firm—Peter L. Michaelson

[57] ABSTRACT

A method of providing score lines in packaging material by local evaporation using a laser beam, wherein the laser beam and the packaging material are movable relative to each other. The score lines are provided in a recurring pattern on at least one side of a web of packaging material as it advances at a uniform, adjustable speed. The intensity of the laser beam is adjustable, and the laser beam is moved in two mutually perpendicular directions under the control of pattern-dependent signals.

4 Claims, 6 Drawing Sheets

METHOD OF PROVIDING SCORE LINES IN PACKAGING MATERIAL

FIELD OF THE INVENTION

This invention relates to a method of providing score lines in packaging material by local evaporation by using a laser beam, wherein the laser beam and packaging material move relative to each other. This method is known from GB-A-2,161,427.

BACKGROUND OF THE INVENTION

The provision of score lines in suitable places in containers contributes largely to the consumer-friendliness of a container in that the container can be opened easily without using special tools such as scissors, knives, nails and teeth, the dosability of the contents once the container is opened is considerably improved because an opening of the desired configuration is produced instead of a randomly extending tear; and the aesthetical appearance of the container after it has been opened is improved.

The score lines themselves should comply with the following requirements: the packaging material, after the score line has been provided, may not tear during further treatment, such as filling, transport, storage, the container should continue to comply with predetermined transmission values, i.e. the contents may not lose aroma, smell, taste and the like or there may be no ingress of water vapor, oxygen and the like into the contents through the score lines.

In the method disclosed in GB-A-2,161,427, sheets that are to be folded into a container are provided with score or fold lines by means of a laser beam, with the configuration of the lines corresponding with a mask placeable on the sheet. The sheets are placed one by one underneath the laser beam. Once the score lines have been provided, these sheets are removed. This method is insufficiently efficient for application on an industrial scale and in particular too slow.

The provision of score lines using a laser beam in an advancing web of packaging material is known from U.S. Pat. No. 3,909,582. In that arrangement, the laser beam is stationary and the score line extends in the direction of advance of the web of packaging material. By imparting to the laser source a reciprocating movement transverse to the direction of advance of the web, the score line can acquire an approximately sinusoidal configuration, as described in U.S. Pat. No. 4,549,063.

SUMMARY OF THE INVENTION

It is an object of the present invention to provide a method of forming score lines of any given configuration in packaging material at a high rate. This method is characterized, according to the present invention, in that the score lines are provided according to a recurring pattern on at least one side of a web of packaging material advancing at uniform, adjustable speed, the laser beam being adjustable in intensity and being moved in two mutually perpendicular directions under the control of pattern-dependent signals.

By packaging material are understood both single materials and multiple complexes, consisting of one or more layers of paper, cellophane, aluminum foil and a very large range of synthetic plastic films, such as polyethylene, polypropylene, polyester, polyamides, PBC, PVDC, surlyn, polystyrene, with the different layers being bonded together with adhesive, lacquer, synthetic plastics material, wax, hot melt and the like.

In certain types of containers, it may be desirable to provide score lines on both sides of the web of packaging material. According to the present invention, this can be attained by means of a laser beam of adjustable intensity, operative on each side of the web of packaging material, each laser beam being steered in two mutually perpendicular directions by pattern-dependent signals--;

BRIEF DESCRIPTION OF THE DRAWINGS

The method according to the present invention will now be described, by way of example, with reference to the accompanying drawings, in which:

FIGS. 3b–3d show alternative forms of score line 21 shown in FIGS. 2a, 2b and 3a;

FIG. 7b depicts a representative side cross-sectional view of the container shown in FIG. 7a;

FIG. 8b depicts a representative side cross-sectional view of the container shown in FIG. 8a;

DETAILED DESCRIPTION

Figures 1, 1A:
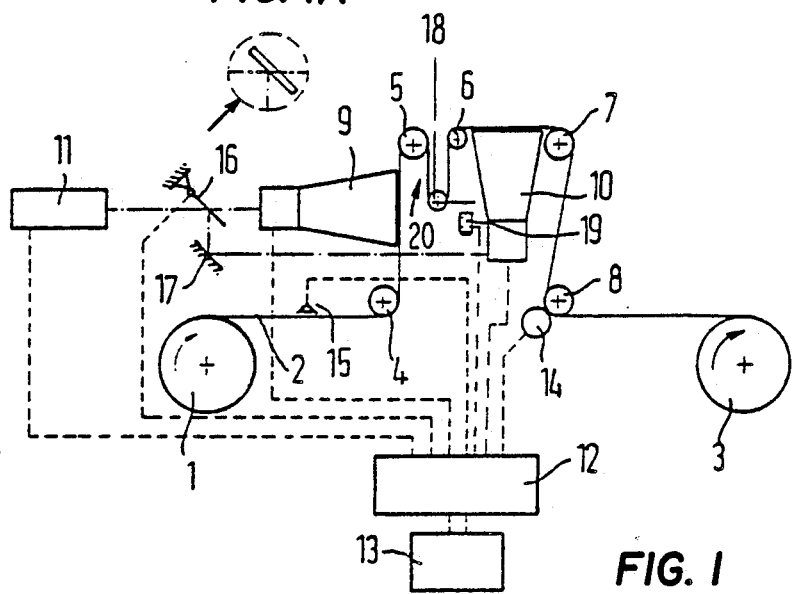
FIG. 1 is a diagrammatic view of the device suitable for applying the method.

FIG. 1 shows a device for applying the method according to the present invention. A roll 1 of packaging material 2 with a recurrent printed pattern is passed through the device for providing score lines on one or possibly two sides, which score lines should naturally be in register with the printed pattern provided on the web of packaging material 2. After providing score lines, the web of material 2 is wound on a roll 3 from which separate containers are cut, with further operations such as filling, sealing, etc.

The web of material 2 is conducted along a first scanner 9 and possibly along a second scanner 10 by means of a plurality of deflector rolls 4-8. Scanners 9, 10 are fed with a laser beam from a laser source 11. Scanners 9, 10 are fitted with so-called flying optics, lenses and focus correction, thereby providing for the possibility of moving the laser beam over the advancing web of material 2 in two mutually perpendicular directions X, Y and at an adjustable intensity. The movement of the laser beam in the X or Y direction is controlled from a control device 12, transmitting control signals to the flying optics and the focus correction of scanner 9 and possibly also to scanner 10. These control signals are generated in control device 12 on the basis of the desired configuration of the score line, which is entered into control device 12 by means of a programming unit 13. Naturally, the control signals should also be related to the advancing speed of the web of material 2. The speed of the web is measured with a suitable transducer 14; the output signal thereof is applied to the control device 12. As the score line to be provided has to be brought into register with the printing pattern of the web of material 2, a scanning eye 15 is provided for scanning the printing. Eye 15 is electrically connected to control device 12.

Scanner 10 which provides a score line possibly at the rear of the web of material 2 can be fed from the laser source 11 by means of a beam splitting mirror 16 and a stationary mirror 17. It is also possible to provide, at the location of the beam splitting mirror 16, a swivelling mirror which is moved under the control of control device 12 at such a frequency that the score lines are formed alternately at the front and the back of the web of material 2.

For the purpose of adjusting the score lines made by the scanner 10, at different pattern lengths of the printed pattern and to a given pattern length, a tensioning roller 18 is provided between deflector rolls 5, 6. Roller 18 is movable, under the control of control device 12, by means of a motor 19 in such a manner that the loop 20 formed in the web of material 2 by the tensioning roller is adjusted to the pattern length.

Examples of packaging materials and score lines provided therein will be described in more detail hereinafter.

EXAMPLE 1 (FIGS. 2a & 2b, and 3a-3d)

Figure 2A:
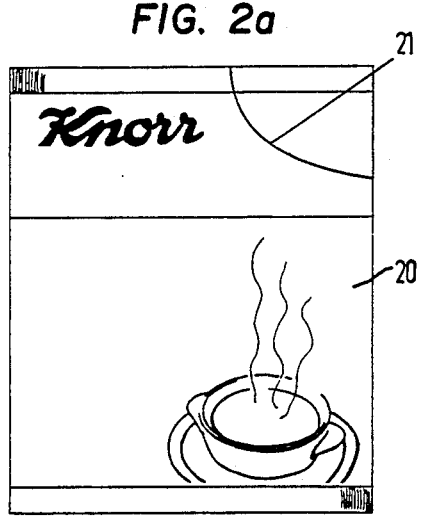
FIG. 2a shows a front view of a sachet containing a dried product.
Figure 2B:
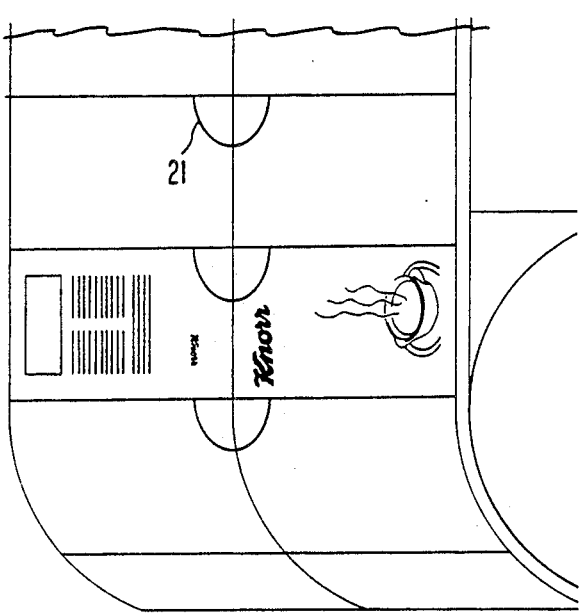
FIG. 2b shows the sachet depicted in FIG. 2a but in a flat rolled condition.

FIG. 2a shows a sachet 20 containing a dried product for soups, sauces and the like, and provided in the right-hand corner with a score line 21, which may have a continuous or a discontinuous form. In the flat position (FIG. 2b) the width of the container is equal to the roll width. Score line 21 has approximately the form of a semi-ellipse. The composition of the packaging material from the outermost to the innermost layers, is as follows:

0.0125 mm polypropylene (11 g/m$^2$)
2 g/m$^2$ lacquer
60 g/m$^2$ coated kraft paper
1 to 1.5 g/m$^2$ adhesive
0.008 mm aluminum foil (21.6 g/m$^2$)
2 g/m$^2$ lacquer
0.025 mm LD polyethylene (24 g/m$^2$).

For the purpose of forming a score line, the entire outer film (polypropylene) and part of the subjacent paper are evaporated according to the selected pattern. The intermediate aluminum foil remains entirely intact and gives shelf life to the contents of the container.

Figure 3B:
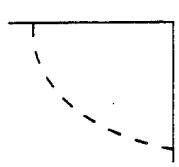
Figure 3C:
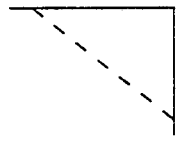
Figure 3D:
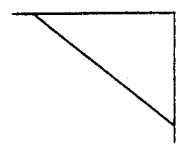
Figure 3A:
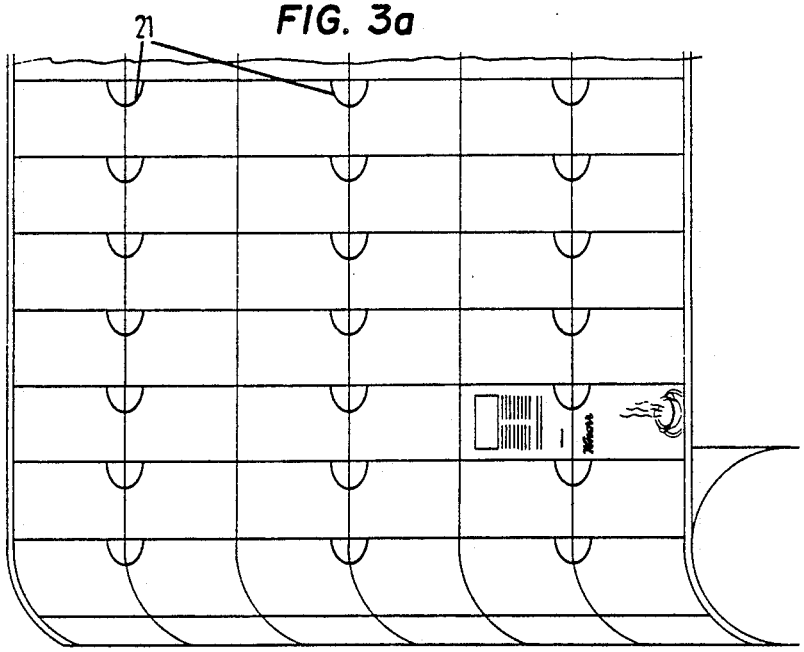
FIG. 3a shows a similar though broader roll to that shown in FIG. 2b.

With broader rolls of packaging material, as shown in FIG. 3a, three parallel, identically moved laser beams are provided for simultaneously forming three juxtaposed score lines 21. FIGS. 3b-d show alternative forms of score line 21. Their configuration is determined on the one hand by aesthetical considerations and on the other hand by the desired ability to dose the contents of the container.

Figure 4A:
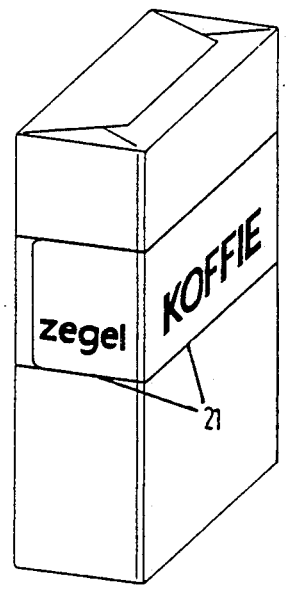
FIG. 4a shows a side perspective view of a coffee container.
Figure 4B:
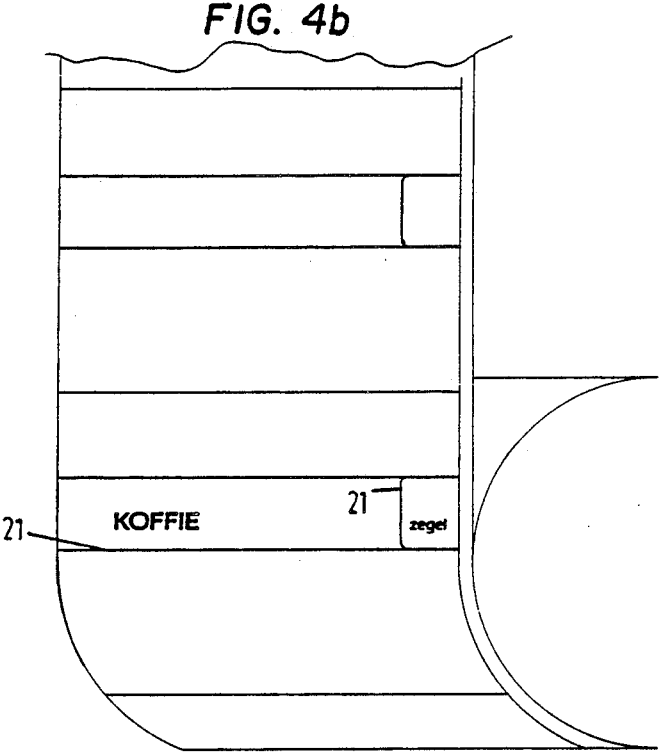
FIG. 4b shows the coffee container depicted in FIG. 4a but in a flat rolled condition.
Figure 5:
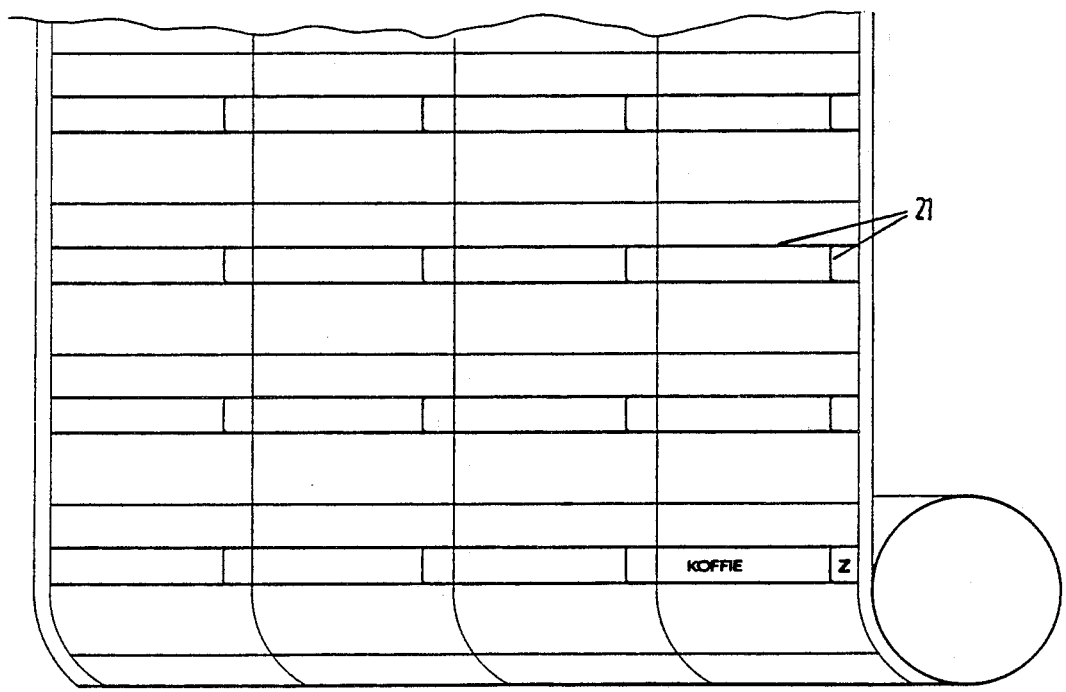
FIG. 5 shows a similar though broader roll to that shown in FIG. 4b.

EXAMPLE 2 (FIGS. 4a & 4b, and 5)

The composition of the packaging material for the coffee package shown in FIGS. 4a & 4b, and 5, from the outermost to the innermost layers,--; is as follows:

0.021 mm polypropylene (19 g/m$^2$)
2 g/m$^2$ lacquer
50 g/m$^2$ coated kraft paper.

The synthetic plastic film of this laminate cannot be torn without scissors or knife. Owing to the score line 21 formed down to the paper, the container can be opened easily and a coupon removed. In this case, too, the width of the spread container may be equal to the roll width (FIG. 4b) or considerably narrower, so that a plurality of containers are located in side-by-side position (FIG. 5).

Figure 6A:
FIG. 6a shows a container for a candy bar.
Figure 6B:
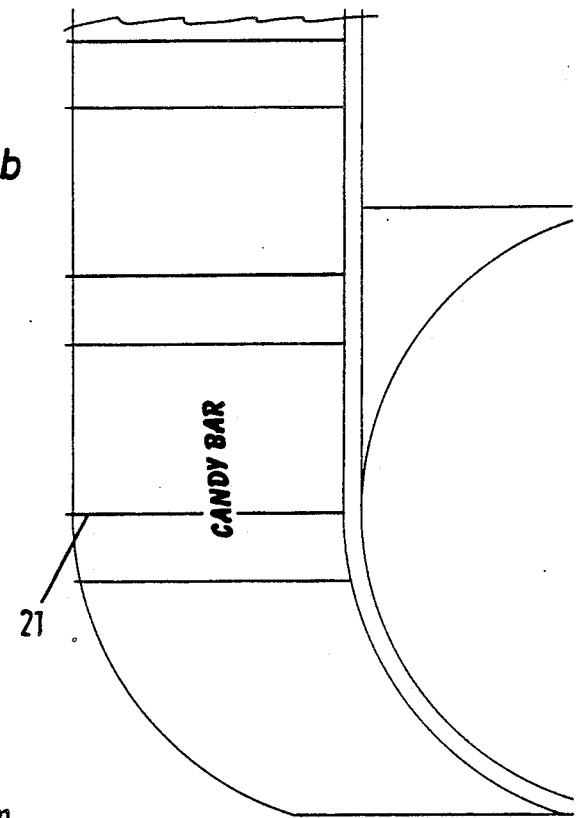
FIG. 6b shows the container depicted in FIG. 6a but in a flat rolled condition.
Figure 6C:
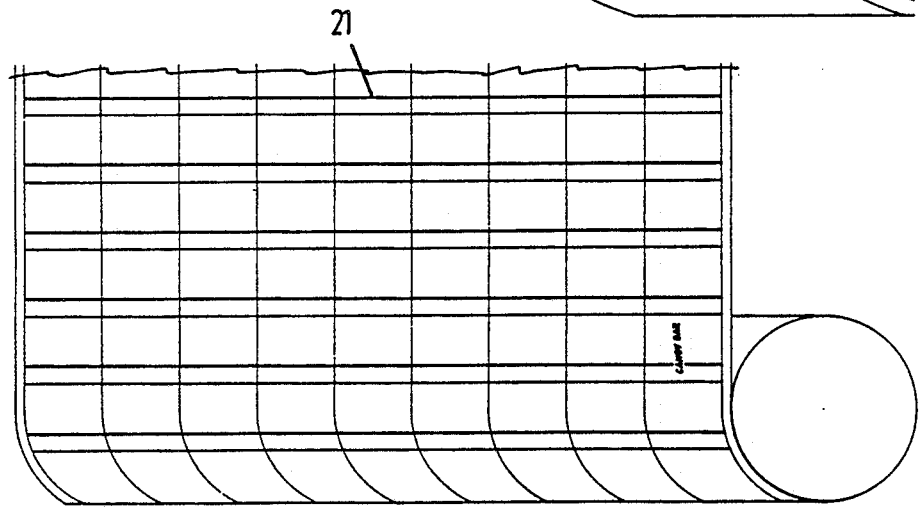
FIG. 6c shows a similar though broader roll to that shown in FIG. 6b.
Figure 7A:
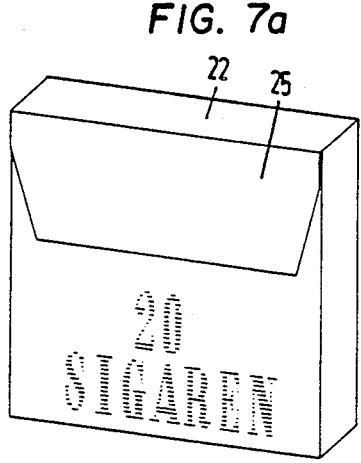
FIG. 7a shows a front perspective view of a cigar container.
Figure 7B:
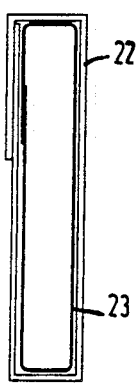
Figure 7C:
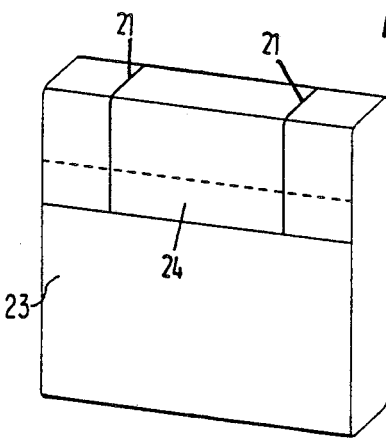
FIG. 7c depicts a front perspective view of bag 23 shown in FIG. 7b.
Figure 7D:
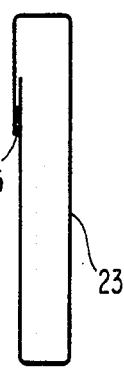
FIG. 7d depicts a representative side cross-sectional view of bag 23 shown in FIG. 7c.
Figure 7E:
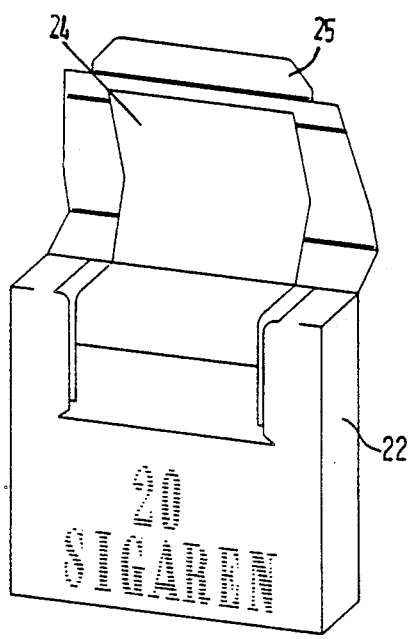
FIG. 7e depicts container 22 shown in FIG. 7a but in its open condition.
Figure 7F:
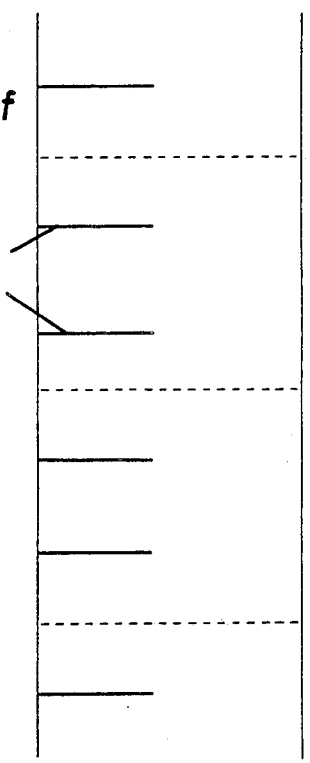
FIG. 7f depicts a portion of a flat web of material used to form a number of bags 23 shown in FIGS. 7c and 7d.

EXAMPLE 3 (FIGS. 6a-6c)

The container shown in FIGS. 6a-6c consists of a single layer of polypropylene of 30-35 u (about 27 or 32 g/m$^2$). This single synthetic plastic film is evaporated partly at the score line 21 and can then be torn off easily along the score line.

EXAMPLE 4 (FIGS. 7a-7f and 8a-8g)

The cigar container shown in FIGS. 7a-7f and 8a-8g and consists of a box 22 of cardboard, wherein a bag 23 is glued. Bag 23 is formed from a non-printed web of material of the following composition, from the outermost to the innermost layers--;

28 g/m$^2$ polyester
13 g/m$^2$ polyethylene
7 u aluminum foil (18.9 g/m$^2$)
18 g/m$^2$ polyethylene.

The outermost polyester layer cannot be torn. By providing the score lines 21 in the two outside synthetic plastic films, it becomes possible for the intermediate portion of the bag to be opened when box 22 is opened. This occurs because the rim 24 of bag 23 is adhered to the tab 25 of box 22. Rim 24 is connected at its opposite side by a ribbon of adhesive 26 to the subjacent front of bag 23 as specifically shown in FIG. 7d. The score lines 21 are provided in the web of material 2 according to a fixed pattern of a given strike-off length.

The aluminum foil and the subjacent polyethylene remain unaffected by the score lines 21, so that the aroma of the cigars continues to be present so long as the container 22, 23 is not opened.

The bag-in-box package shown in FIGS. 8a-8g differs from that shown in FIGS. 7a-7f only in that the bag 23 is sealed in another place by a sealing seam 27. Score lines 21 in this case do not continue as far as the turned down rim of the packaging material but terminate in the "full" material near the point P. To ensure the proper opening of bag 23 by means of tab 25 of box 22, the ends of the score lines 21 should be interconnected by a horizontal score line 28, to be provided both at the front and at the back of the web of material 2. Naturally, here too, tab 25 is connected near score line 28 to bag 23 by means of gluing.

In the event of long score lines or lines of weakness of complicated configuration, it may be desirable to split the lines into parts which are each provided in the web of material with a separately controllable laser beam. In the device shown diagrammatically in FIG. 1, two laser beams with associated scanners 9 should then be available on the same side of the web of material 2, while naturally control device 12 should be adapted for the independent control of the two scanners 9.

I claim:

1. A method for providing score lines in single or multi-layered thin film packaging material through local evaporation of a portion of said material using a controllable laser beam, said method comprising the steps of:

advancing a web of thin-film packaging material at a uniform adjustable speed in a web path past a first laser beam directed onto a first side of said web so as to locally evaporate material from said first side thereby forming score lines thereon, wherein said web has a recurring pattern of printed images appearing on one side thereof;

moving said first laser beam in two mutually perpendicular directions in the web path from a fixed point in response to pattern dependent control signals, said signals defining a path of said score lines to be provided on said first side and in registration with said pattern and being responsive to the speed of said web; and adjusting a focal length of said first laser beam so that the focus of the first laser beam is maintained on the first side of said web while said score lines are being formed thereon.

2. The method claimed in claim 1 further comprising the step of: directing a second controllable laser beam on a second side of the web so as to provide score lines in said second side that are at least partly in registration with the score lines provided on the first side of the web.

3. The method claimed in claim 1 further comprising the step of: directing a second controllable laser beam on the first side of the web such that score lines formed by said second controllable laser beam provide contiguous portions of the score lines formed by said first controllable laser beam.

4. The method claimed in claim 1 further comprising the steps of:

monitoring positional irregularities in the recurring pattern of printed images appearing on said one side of the web; and adjusting, in response to said monitoring step, the pattern dependent control signals so as to maintain said score lines in registration with said pattern.

* * * * *

UNITED STATES PATENT AND TRADEMARK OFFICE
CERTIFICATE OF CORRECTION

PATENT NO. : 5,001,325
DATED : March 19, 1991
INVENTOR(S) : Gert J. Huizinga

Figure 8A:
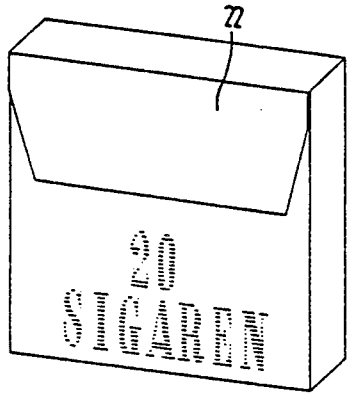
FIG. 8a shows a front perspective view of another cigar container.
Figure 8B:
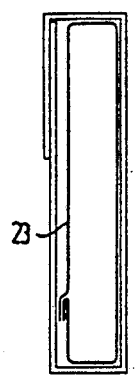
Figure 8C:
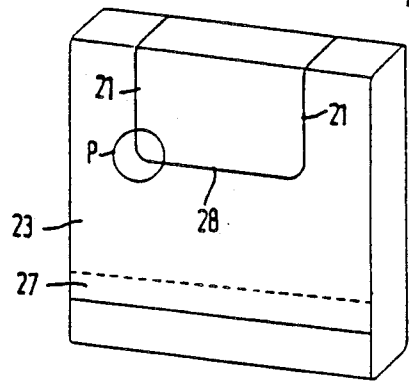
FIG. 8c depicts a front perspective view of bag 23 shown in FIG. 8b.
Figure 8D:
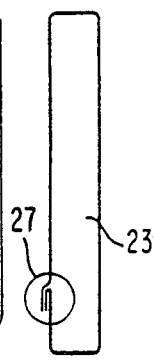
FIG. 8d depicts a representative side cross-sectional view of bag 23 shown in FIG. 8c.
Figure 8E:
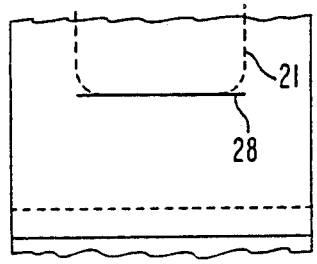
FIG. 8e depicts a front view of bag 23 shown in FIG. 8c specifically showing the manner in which score lines 21 and 28 are oriented.
Figure 8H:
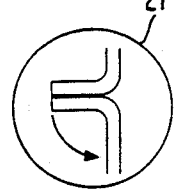
Figure 8F:
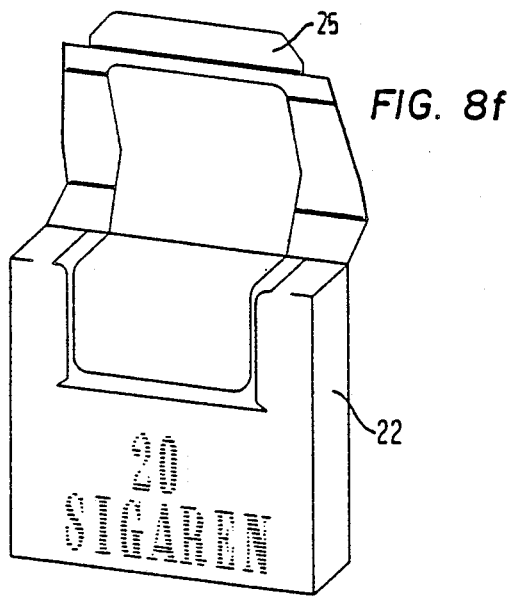
FIG. 8f depicts container 22 shown in FIG. 8a but in its open condition.
Figure 8G:
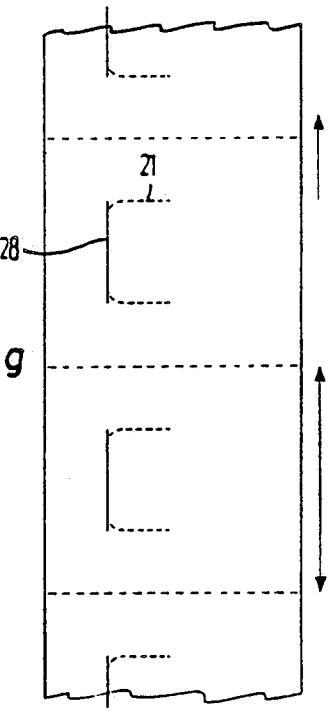
FIG. 8g depicts a portion of a flat web of material used to form a number of bags 23 shown in FIGS. 8c and 8d.

It is certified that error appears in the above-identified patent and that said Letters Patent is hereby corrected as shown below:

Column 2, line 17, change "FIG. 1 is" to --FIGS. 1 and 1A are--;
        line 58, change "FIG. 8d depicts" to --FIGS. 8d and 8h depict--;

Column 3, line 3, change "FIG. 1" to --FIGS. 1 and 1A--;

Column 4, line 45, change "FIGS. 7a-7f and 8a-8g" to --FIGS. 7a-7f and 8a-8h--;
        line 46, change "FIGS. 7a-7f and 8a-8g" to --FIGS. 7a-7f and 8a-8h--.

Signed and Sealed this

Fifth Day of January, 1993

Attest:

DOUGLAS B. COMER

Attesting Officer      Acting Commissioner of Patents and Trademarks